Patented Apr. 2, 1940

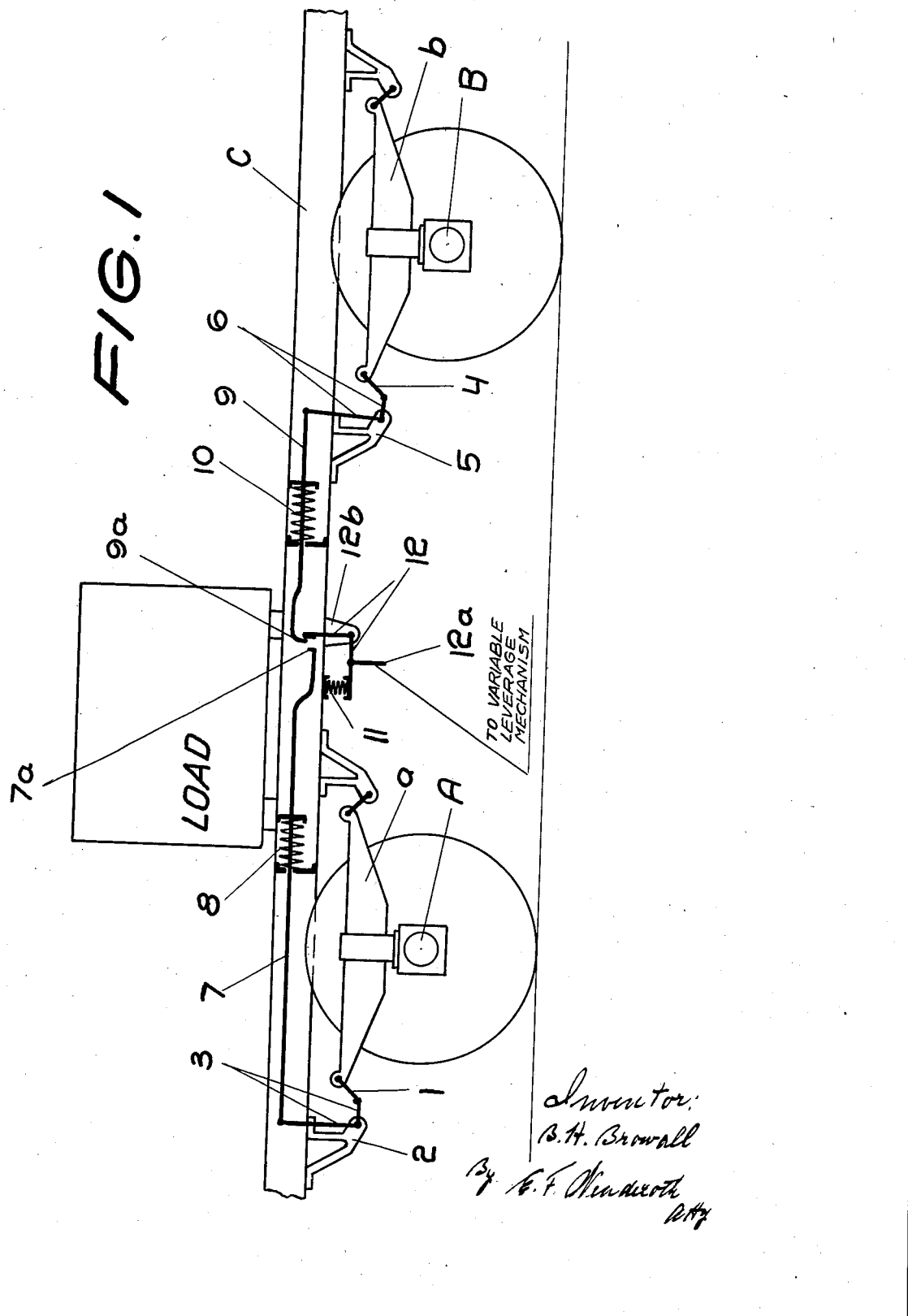

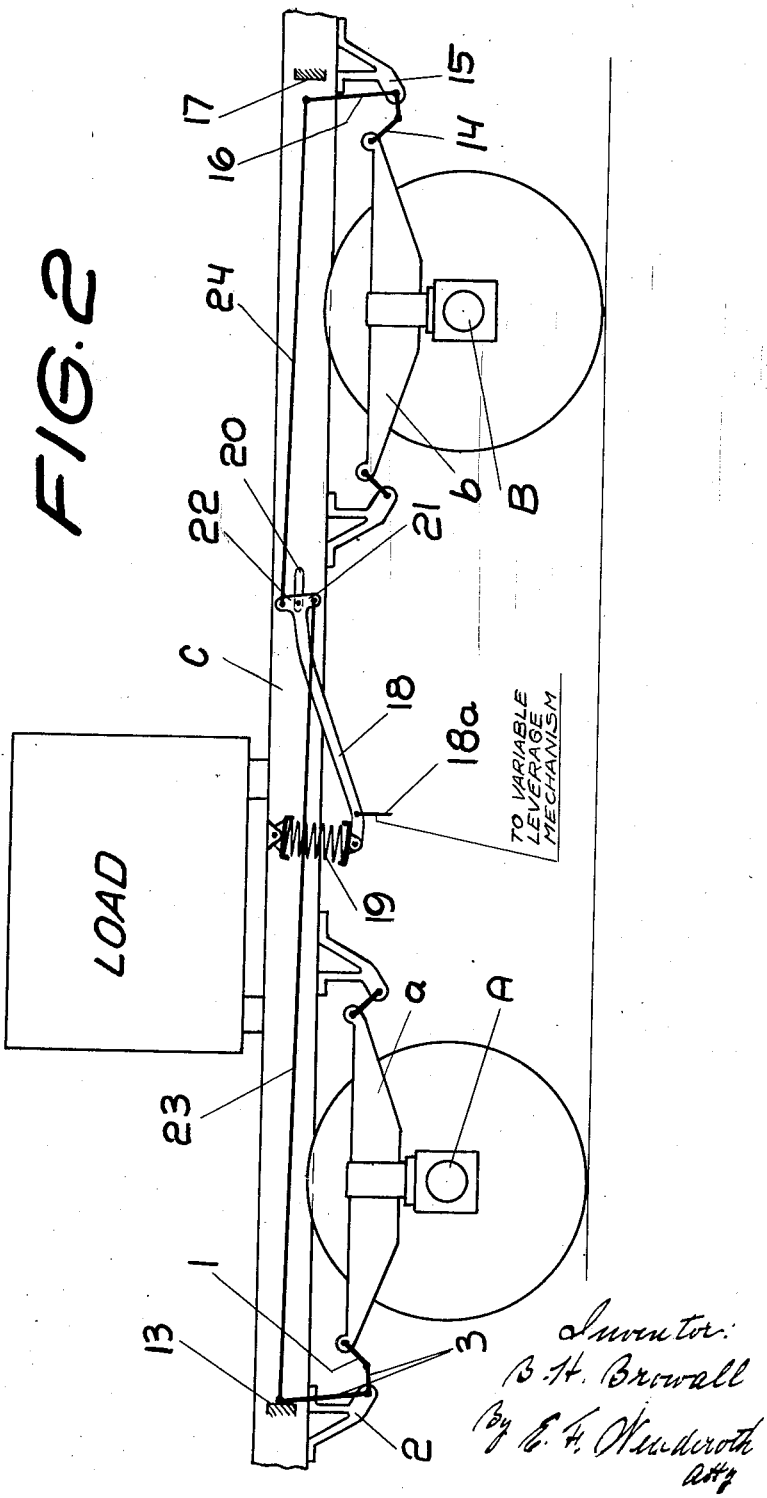

2,195,508

UNITED STATES PATENT OFFICE 2,195,508

APPARATUS FOR AUTOMATIC ADJUSTMENT OF VARIABLE LOAD BRAKES

Bert Henry Browall, Malmo, Sweden, assignor to Svenska Aktiebolaget Bromsregulator, Malmo, Sweden, a corporation of Sweden Application February 10, 1938, Serial No. 189,880
In Austria February 11, 1937

8 Claims. (Cl. 188—195)

This invention relates to variable load brakes on railway and other vehicles and more particularly to apparatus for automatically adjusting the variable load brake in accordance with the load carried by the vehicle.

In variable load brakes it has been proposed to vary the leverage of the brake rigging for the purpose of varying the braking effort, that is the brake shoe pressure, by means of a so-called variable leverage mechanism operatively connected to an operating member actuated by the variations of the pressure of the vehicle supporting springs at one end of the vehicle. This arrangement suffers from the drawback that the magnitude of the braking effort is determined only by the load carried by the wheel axle or axles at the end of the vehicle from which the actuation of the operating member for the variable leverage mechanism is derived. Therefore, should the load be non-uniformly distributed over the length of the vehicle, so that the said end of the vehicle carries a greater load than the other, the braking effort is adjusted according to the said greater load, whereby the wheels at the less loaded other end of the vehicle run the risk of being slided at a braking operation.

With a view to do away with this drawback it has been proposed to derive the actuation of the operating member for the variable leverage mechanism from the vehicle supporting spring pressures at both ends of the vehicle, the actuating influences derived from such pressures at the opposite ends of the vehicle being summed up for joint action on the operating member and counteracted by a spring in common to both. Thus, in this proposal the braking effort is adjusted in accordance with the magnitude of the sum of the vehicle supporting spring pressures at the opposite ends of the vehicle, that is in accordance with the total load carried by the vehicle, irrespective of whether the load is uniformly distributed over the length of the vehicle or not. By this arrangement the aforesaid drawback, however, is not done away with. On the contrary it is made worse because of the fact that the braking effort is adjusted to and remains at the same value for a given value of the load of the vehicle irrespective of whether such load is placed at, or be displaced towards, one end or the other of the vehicle. Therefore, in the last mentioned proposal there always is the risk of the wheels at the less loaded end of the vehicle being slided, whereas in the first mentioned proposal only the wheels at one end of the vehicle (namely at the end opposite to that from which the actuation of the operating member for the variable leverage mechanism is derived) run this risk, should this end be less loaded than the other.

The object of the present invention is to provide an apparatus in which the actuation of the operating member for the variable leverage mechanism is derived from the vehicle supporting spring pressure at both ends of the vehicle but in such a manner that the risk of sliding the wheels at the less loaded end of the vehicle is wholly eliminated.

With this and other objects in view, the invention consists of certain novel features of construction, combination and arrangement of parts as will be more fully described and claimed hereinafter, reference being had to the accompanying drawings which diagrammatically illustrate the invention by way of two examples, and in which:

Fig. 1 is a side elevation of the parts necessary for understanding the invention according to one embodiment thereof, Fig. 2 is a side elevation of the parts necessary for understanding the invention according to a second embodiment thereof.

In the drawings A and B are the wheel axles of a railway or other vehicle having two axles. The vehicle has a frame C suspended by means of links to supporting springs $a$ and $b$ reposing on the axles A and B.

In the embodiment of the invention illustrated in Fig. 1 the outer spring suspension link 1 at the axle A is not hinged directly to the associated bracket 2 but is connected to one arm of a bell crank lever 3 pivoted to the said bracket. To the other arm of the lever 3 there is connected a rod 7 extending longitudinally of the vehicle and displaceable in accordance with the magnitude of the portion of the vehicle load carried on the axle A and against the action of a spring 8. Likewise the inner spring suspension link 4 at the other wheel axle B is not hinged directly to the associated bracket 5 but is connected to one arm of a bell crank lever 6 pivoted to the bracket 5. To the other arm of the lever 6 there is connected a rod 9 which is displaceable longitudinally of the vehicle in accordance with the magnitude of the portion of the vehicle load carried on the axle B and against the action of a spring 10. The two rods 7 and 9 which at the loading of the vehicle are displaced in the same direction are provided at their free ends with abutments 7a and 9a with which a lever 12 cooperates, the lever 12 being pivoted to a bracket 12b and actuated by a spring 11 which is weak in relation to each of the springs 8 and 10. This lever 12 serves the purpose of operating a variable leverage mechanism connected thereto by means of a rod 12a or the like. The brake proper and the rigging thereof as well as the variable leverage mechanism provided in the brake rigging and serving the purpose of gradually varying the brake applying leverage of the brake rigging according to variations of the load of the vehicle may be of any known or suitable type and do not form part of the present invention and, therefore, are not shown on the drawings.

One type of variable leverage mechanism which may be operated by the rod 12a in Fig. 1 (or by the rod 18a in Fig. 2) is shown in the U. S. Patent No. 1,898,528.

As will be found from an inspection of Fig. 1 the actuation of the operating member 12 for the variable leverage mechanism from the two opposite ends of the vehicle is derived through separate means, namely through the parts 1, 3, 8 and 7a from the one end of the vehicle and through the parts 4, 6, 9, 10 and 9a from the other end of the vehicle, and the arrangement is such that the said two separate means can actuate the operating member 12 independently of each other and in such a manner that the actuation of the operating member 12 always will be solely through the means associated with the end of the vehicle occasionally carrying the smaller portion of the load, should the latter be non-uniformly distributed between the ends of the vehicle. Thus, whenever the load of the vehicle is non-uniformly distributed, the support of the lever 12 under the action of the spring 11 always will be through the one of the two abutments 7a and 9a, the position of which is determined by the portion of the load carried on the less loaded axle of the vehicle, and independently of the other one of the said two abutments. The drawings show the vehicle loaded with a load carried to a greater portion by the axle A than by the axle B. In this case, therefore, the lever 12 supports itself against the abutment 9a, so that the position of the lever 12 is determined by the actuation through the means (6, 9, 10) associated with the less loaded axle B. Should the axle B be loaded to a higher degree than the axle A, the abutment 7a at the free end of the rod 7 will form the support for the lever 12, so that in this case the position of the lever 12 will be determined by the actuation through the means (3, 7, 8) associated with the axle A.

In the embodiment of the invention illustrated in Fig. 2 the outer spring suspension link 1 at the axle A is connected to a bell crank lever 3 pivoted to the bracket 2 in the same manner as in Fig. 1. Further the outer spring suspension link 14 at the axle B is connected to a bell crank lever 16 pivoted to the bracket 15. As will be seen the levers 3 and 16 will be turned in opposite directions through the action of the load when loading the vehicle. A lever 18 which is pivoted to the frame C of the vehicle and actuated by a spring 19 is provided with two transverse arms 21 and 22 which are so connected by means of rods 23 and 24 with the levers 3 and 16 that the torques exerted on the levers 3 and 16 by the load of the vehicle is counteracted by the torque exerted on the lever 18 by the spring 19. Thus, the lever 18 will be turned in accordance with variations of the load of the vehicle and operate a variable leverage mechanism (not shown) which is connected thereto by means of a rod 18a or the like. However, in accordance with the present invention the pivot of the lever 18 is slidable in a guide 20 substantially in the direction of the forces exerted on the lever 18 by the means 1, 3, 23 and 14, 16, 24 for deriving the actuation of the lever 18. Each of the levers 3 and 16 cooperates with a fixed abutment 13 and 17, respectively, which limits the movement of the lever 13 or 17 in the direction in which it is turned at an increase of the load of the vehicle. Should the load of the vehicle be non-uniformly distributed between the axles A and B, so that the force on the lever 18 through the actuating means 1, 3, 23 or 14, 16, 24 associated with the most loaded axle overcomes the force exerted on the lever 18 through the actuating means associated with the less loaded axle, the whole system, that is the lever 18, the rods 23 and 24 and the bell crank levers 3 and 16, is moved in the direction of the greater force until the bell crank lever 3 or 16 associated with the most loaded axle supports itself against its fixed abutment 13 or 17. Hereafter only the bell crank lever associated with the less loaded axle can actuate the lever 18 so as to turn the same for adjustment of the braking effort in accordance with the load carried by the less loaded axle. Should the load of the vehicle be non-uniformly distributed between the axles A and B as shown in Fig. 2, so that the axle A carries a greater portion of the load than the axle B, the force exerted on the lever 18 by the lever 3 through the rod 23 will overcome the force exerted on the lever 18 by the lever 16 through the rod 24. In this case the whole system is displaced to the left until the lever 3 supports itself against the abutment 13, and hereafter the adjustment of the lever 18 for adjusting the braking effort will depend solely upon the magnitude of the portion of the load carried by the less loaded axle B, the lever 18 being actuated through the parts 14, 16 and 24 and fulcrumed in its point of junction with the rod 23. Similarly, should the axle A be less loaded than the axle B, the adjustment of the lever 18 for varying the braking effort will depend solely upon the magnitude of the portion of the load carried by the less loaded axle A, the lever 18 in this case being actuated through the parts 1, 13 and 23 and fulcrumed in its point of junction with the rod 24.

It will be evident that the invention is not limited to the particular construction and arrangement of parts hereinbefore described, which may be varied as desired to suit particular requirements without exceeding the scope of the invention. Further it is not necessary that the adjustment of the braking effort should be effected through a so called variable leverage mechanism in the brake rigging, the apparatus contemplated by the invention being also applicable for the automatic operation of variable braking effort equipments of other kinds.

What I claim and desire to secure by Letters Patent is:

1. The combination with a railway or other vehicle having supporting springs at its opposite ends, of an apparatus for automatically adjusting a variable load brake for the vehicle, comprising an operating lever for the variable load brake, means for biasing said lever towards a position corresponding to non-loaded vehicle, separate means for actuating said operating lever against said biasing means by forces derived from the supporting spring pressures at the opposite ends of the vehicle and tending to slide said operating lever in directions substantially opposite to each other, means pivoting said operating lever and rendering it slidable in said directions, and abutments for said actuating means for limiting their movements under the actions of said forces.

2. In the combination as claimed in claim 1 the additional feature that the actuating means for the operating lever comprise bell crank levers pivoted at the opposite ends of the vehicle and acted upon by the supporting spring pressures at the respective ends of the vehicle, and pull rods connecting said bell crank levers to arms provided on the operating lever and projecting on opposite sides of the slidable pivot thereof, the movements of the bell crank levers under the actions of the supporting spring pressures being limited by the said abutments so that when one of said bell crank levers supports itself against its abutment the torque exerted on the operating lever against the biasing means thereof will be determined solely by the actuation of the operating lever from the other bell crank lever.

3. The combination with a railway or other vehicle having supporting springs at its opposite ends, of an apparatus for automatically adjusting a variable load brake for the vehicle according to the load thereof, comprising an operating member for the variable load brake, biased in one direction, separate means for deriving forces from the vehicle supporting spring pressures at the opposite ends of the vehicle, spring means, other than the vehicle supporting springs, for balancing said forces, and members movable independently of each other under the control of said forces and said balancing spring means and so arranged for actuating said operating member in the other direction that the extent of actuation of said operating member in said other direction always is determined solely by the one of said forces derived from the supporting spring pressure at the end of the vehicle occasionally carrying the smaller portion of the load, should the latter be non-uniformly distributed between the ends of the vehicle.

4. The combination with a railway or other vehicle having supporting springs at its opposite ends, of an apparatus for automatically adjusting a variable load brake for the vehicle according to the load thereof, comprising an operating member for the variable load brake, biased in one direction towards a position corresponding to fully loaded vehicle, separate means for deriving forces from the vehicle supporting spring pressures at the opposite ends of the vehicle, separate spring means for balancing said forces, and members movable independently of each other under the control of said forces and said balancing spring means and so arranged for actuating said operating member in the other direction towards a position corresponding to empty vehicle that the extent of actuation of said operating member in said other direction always is determined solely by the one of said forces derived from the vehicle supporting spring pressure at the end of the vehicle occasionally carrying the smaller portion of the load, should the latter be non-uniformly distributed between the ends of the vehicle.

5. The combination with a railway or other vehicle having supporting springs at its opposite ends, of an apparatus for automatically adjusting a variable load brake for the vehicle according to the load thereof, comprising an operating member for the variable load brake, means biasing said operating member in one direction towards a position corresponding to fully loaded vehicle, separate means for deriving forces from the vehicle supporting pressures at the opposite ends of the vehicle, separate spring means opposing said forces, members movable in substantially the same direction independently of each other by said separate spring means under the control of said forces for actuating said operating member in the other direction towards a position corresponding to empty vehicle, said members being so arranged that, should the load of the vehicle be non-uniformly distributed between the ends thereof, the actuation of said operating member in said other direction by the one of said movable members controlled by the force derived from the less loaded end of the vehicle deprives said operating member of the actuation by the other of said movable members.

6. In the combination claimed in claim 5 the additional features that said operating member comprises a lever and that said movable members comprise slidable rods providing abutments for supporting said operating lever against its biasing means.

7. In the combination claimed in claim 5 the additional feature that the power of said biasing means for said operating member is weak in relation to said spring means opposing said forces and tending to move said movable members in the direction for actuating said operating member against its biasing means.

8. The combination with a railway or other vehicle having supporting springs at its opposite ends, of an apparatus for automatically adjusting a variable load brake for the vehicle, comprising an operating lever for the variable load brake, means biasing said operating lever in one direction towards a position corresponding to empty vehicle, and separate means for deriving forces from the vehicle supporting spring pressures at the opposite ends of the vehicle and for actuating said operating lever by said forces in the other direction against said biasing means towards a position corresponding to fully loaded vehicle, said separate means being movable independently of each other and the arrangement bing such that, should the load of the vehicle be non-uniformly distributed between the ends thereof, the actuation of said operating lever in said other direction always is solely by the one of said separate means associated with the less loaded end of the vehicle.

BERT HENRY BROWALL.